(12) United States Patent
Cocchi et al.

(10) Patent No.: US 9,277,259 B2
(45) Date of Patent: *Mar. 1, 2016

(54) METHOD AND APPARATUS FOR PROVIDING SECURE INTERNET PROTOCOL MEDIA SERVICES

(71) Applicant: SypherMedia International, Inc., Westminster, CA (US)

(72) Inventors: Ronald P. Cocchi, Seal Beach, CA (US); Gregory J. Gagnon, Redondo Beach, CA (US); Frances C. McKee-Clabaugh, San Pedro, CA (US); Michael A. Gorman, Cypress, CA (US)

(73) Assignee: SypherMedia International, Inc., Westminster, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/312,560

(22) Filed: Jun. 23, 2014

(65) Prior Publication Data

US 2015/0003614 A1    Jan. 1, 2015

Related U.S. Application Data

(63) Continuation-in-part of application No. 11/974,329, filed on Oct. 12, 2007, now Pat. No. 8,761,393.

(60) Provisional application No. 60/851,485, filed on Oct. 13, 2006, provisional application No. 60/901,889, filed on Feb. 16, 2007.

(51) Int. Cl.
*H04N 7/167* (2011.01)
*H04N 21/254* (2011.01)
(Continued)

(52) U.S. Cl.
CPC .......... *H04N 21/2541* (2013.01); *H04L 9/0822* (2013.01); *H04N 5/913* (2013.01); *H04N 7/163* (2013.01); *H04N 21/26606* (2013.01); *H04N 21/4334* (2013.01); *H04N 21/6125* (2013.01);
(Continued)

(58) Field of Classification Search
None
See application file for complete search history.

(56) References Cited

U.S. PATENT DOCUMENTS

| 4,757,534 A | 7/1988 | Matyas et al. |
| 5,790,663 A | 8/1998 | Lee et al. |

(Continued)

FOREIGN PATENT DOCUMENTS

| WO | 99/43120 | 8/1999 |
| WO | 02/01333 | 1/2002 |

(Continued)

OTHER PUBLICATIONS

Cinea press release "Cinea, Inc. To Provide IFE Key Management Services for Universal Pictures and Twentieth Century Fox" Sep. 9, 2003.

(Continued)

*Primary Examiner* — Michael Chao
*Assistant Examiner* — Devin Almeida
(74) *Attorney, Agent, or Firm* — Gates & Cooper LLP

(57) ABSTRACT

A method and apparatus for securely and remotely enabling the playing of a media program encrypted by a content encryption key over the Internet is disclosed. A license encryption key and a content decryption key are separately and securely transmitted to the receiver. The license encryption key is stored in the CAM and later used to decrypt the content encryption key so that the media program may be recovered.

28 Claims, 8 Drawing Sheets

(51) Int. Cl.
*H04L 9/08* (2006.01)
*H04N 5/913* (2006.01)
*H04N 7/16* (2011.01)
*H04N 21/266* (2011.01)
*H04N 21/61* (2011.01)
*H04N 21/835* (2011.01)
*H04N 21/433* (2011.01)
*H04N 21/8355* (2011.01)

(52) U.S. Cl.
CPC ......... *H04N 21/835* (2013.01); *H04N 21/8355* (2013.01); *H04L 2209/24* (2013.01); *H04N 2005/91364* (2013.01)

(56) References Cited

U.S. PATENT DOCUMENTS

| | | | |
|---|---|---|---|
| 5,940,504 | A | 8/1999 | Griswold |
| 6,240,401 | B1 | 5/2001 | Oren et al. |
| 6,243,468 | B1 | 6/2001 | Pearce et al. |
| 6,285,774 | B1 | 9/2001 | Schumann et al. |
| 6,550,011 | B1 | 4/2003 | Sims, III |
| 6,681,212 | B1 | 1/2004 | Zeng |
| 6,931,545 | B1 | 8/2005 | Ta et al. |
| 6,957,344 | B1 | 10/2005 | Goldshlag et al. |
| 7,007,170 | B2 | 2/2006 | Morten |
| 7,295,681 | B2 | 11/2007 | Lubin et al. |
| 7,305,087 | B1 | 12/2007 | Ques et al. |
| 7,328,345 | B2 | 2/2008 | Morten et al. |
| 7,356,143 | B2 | 4/2008 | Morten |
| 7,376,233 | B2 | 5/2008 | Candelore et al. |
| 7,383,446 | B1 | 6/2008 | Hatanaka et al. |
| 8,688,991 | B1 | 4/2014 | Sunil |
| 2002/0021805 | A1 | 2/2002 | Schumann et al. |
| 2002/0067914 | A1 | 6/2002 | Schumann et al. |
| 2002/0094084 | A1 | 7/2002 | Wasilewski et al. |
| 2003/0046568 | A1 | 3/2003 | Riddick et al. |
| 2004/0010717 | A1 | 1/2004 | Simec et al. |
| 2004/0034582 | A1 | 2/2004 | Gilliam et al. |
| 2004/0039704 | A1 | 2/2004 | Gilliam et al. |
| 2004/0078575 | A1 | 4/2004 | Morten et al. |
| 2004/0107356 | A1 | 6/2004 | Shamoon et al. |
| 2004/0133803 | A1 | 7/2004 | Rabin et al. |
| 2004/0184616 | A1 | 9/2004 | Morten |
| 2005/0005098 | A1 | 1/2005 | Michaelis et al. |
| 2005/0172122 | A1 | 8/2005 | Risan et al. |
| 2005/0278257 | A1 | 12/2005 | Barr et al. |
| 2006/0005253 | A1 | 1/2006 | Goldshlag et al. |
| 2006/0010500 | A1 | 1/2006 | Elazar et al. |
| 2006/0101287 | A1 | 5/2006 | Morten |
| 2006/0143481 | A1 | 6/2006 | Morten |
| 2006/0159303 | A1 | 7/2006 | Davis et al. |
| 2006/0239503 | A1 | 10/2006 | Petrovic et al. |
| 2007/0033419 | A1 | 2/2007 | Kocher et al. |
| 2008/0089516 | A1 | 4/2008 | Cocchi et al. |
| 2012/0185693 | A1 | 7/2012 | Chen et al. |

FOREIGN PATENT DOCUMENTS

| | | |
|---|---|---|
| WO | 2004112385 | 12/2004 |
| WO | 2005/106621 | 11/2005 |
| WO | 2006/044765 | 4/2006 |

OTHER PUBLICATIONS

DRM Watch Magazine Article "Cinea DRM for DVDs Endorsed for Oscar Screeners", Jul. 8, 2004.

Digital lifestyles Magazine Article "Secure DVD Players for BAFTA Judges", Aug. 31, 2004.

PCT International Search Report & Written Opinion dated Oct. 7, 2015 for PCT App. No. PCT/US2015/037259.

Enabling the STB

Establishing a Secure
CAM-Headend Communication
Channel

Obtaining License to View/Use Media Program

Playing Media Program

METHOD AND APPARATUS FOR PROVIDING SECURE INTERNET PROTOCOL MEDIA SERVICES

CROSS-REFERENCE TO RELATED APPLICATIONS

This application is a continuation-in-part of U.S. patent application Ser. No. 11/974,329, entitled "METHOD AND APPARATUS FOR PROVIDING SECURE INTERNET PROTOCOL MEDIA SERVICES," by Ronald P. Cocchi, Gregory J. Gagnon, Francie Mc-Kee Clabaugh, and Michael A. Gorman, filed Oct. 12, 2007, which application is incorporated by reference herein and claims benefit of the following U.S. Provisional Patent Applications, both of which applications are also hereby incorporated by reference herein:

U.S. Provisional Patent Application No. 60/851,485, entitled "SYSTEM SECURITY ARCHITECTURE FOR INTERNET PROTOCOL TELEVISION SERVICES," by Ronald P. Cocchi, Gregory J. Gagnon, Francie Mc-Kee Clabaugh, and Michael A. Gorman, filed Oct. 13, 2006;

U.S. Provisional Patent Application No. 60/901,889, entitled "SYSTEM SECURITY ARCHITECTURE FOR INTERNET PROTOCOL TELEVISION SERVICES," by Ronald P. Cocchi, Gregory J. Gagnon, Francie Mc-Kee Clabaugh, and Michael A. Gorman, filed Feb. 16, 2007.

BACKGROUND OF THE INVENTION

1. Field of the Invention

The present invention relates to systems and methods for the secure provision of media programs such as audiovisual materials to subscribers for storage and/or viewing.

2. Description of the Related Art

Media programs such as television and radio programs were first provided to viewers via terrestrial broadcast networks. Such media programs were provided to viewers/listeners free of charge. More recently, this free-of-charge dissemination model has been augmented with a fee-for-service and/or fee-for-view model in which paying subscribers are provided access to a greater variety and number of media programs, including video programs, audio programs and the like, by cable, satellite and terrestrial broadcasts. Further, in current media program subscription business models, subscribers are typically offered services from a small number of providers (e.g. DIRECTV or ECHOSTAR, or the approved local cable provider) each of which typically provide a large number of media channels from a variety of sources (e.g. ESPN, HBO, COURT TV, HISTORY CHANNEL). To assure that only subscribers receive the media programs, each service provider typically encrypts the program material and provides the specialized equipment that is necessary for the customer to decrypt them so that they can be viewed.

Increasingly, individuals are using the Internet to gain access to media programs of all kinds. Recent wide-scale availability of digital subscriber line (DSL), fiber optic and cable modems have increased the bandwidth of data that can be provided to homes via the Internet. While these high bandwidth sources are still primarily used to obtain audio media programs, video media programs are increasingly transmitted via the Internet. However, while the Internet provides additional channels by which media programs may be provided to subscribers, the Internet also presents many challenges and opportunities regarding conditional access architectures. For example, transmission of information via the Internet can be performed using Transport Layer Security (TLS) or Secure Sockets Layer (SSL) cryptographic protocols to provide secure communication of media programs and other information. However, while such protocols can be used to securely transmit information, they do not provide the level of security nor the control over the use of the media program that media program providers require in a typical subscription system.

Accordingly, there is a need for access to media services via the Internet that provides security superior to that which can be obtained with internet protocol (IP) techniques alone, and which provides increased flexibility in how the media programs thus transferred are used. The present invention satisfies that need.

SUMMARY OF THE INVENTION

To address the requirements described above, this specification discloses a method and apparatus for securely enabling the playing of a media program encrypted by a content encryption key (CEK). In one embodiment, the method comprises the steps of receiving the license request from a receiver station in a headend, the license request generated in response to a user media program request and comprising a receiver identifier; determining whether the license request is authorized; encrypting the CEK with a receiver key to produce an encrypted content encryption key (ECEK) and generating a license comprising the encrypted content encryption key (ECEK) if the license request is authorized; encrypting the license according to a license encryption key (LEK) to produce an encrypted license, which may be disposed in an encrypted license file (ELF); and transmitting the encrypted license file (ELF) to the receiver station. Another embodiment of the invention is evidenced by a headend having a first module for receiving a license request from a receiver station, the license request comprising a receiver identifier and generated in response to a user media program request, and a second module for encrypting the content encryption key (CEK) with receiver key to produce an encrypted content encryption key (ECEK), for generating a license comprising the encrypted content encryption key (ECEK); for encrypting the license according to a license encryption key (LEK) to produce an encrypted license file (ELF); and for transmitting the encrypted license file (ELF) to the receiver if the license request is authorized.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Architecture Overview

Figure 1:
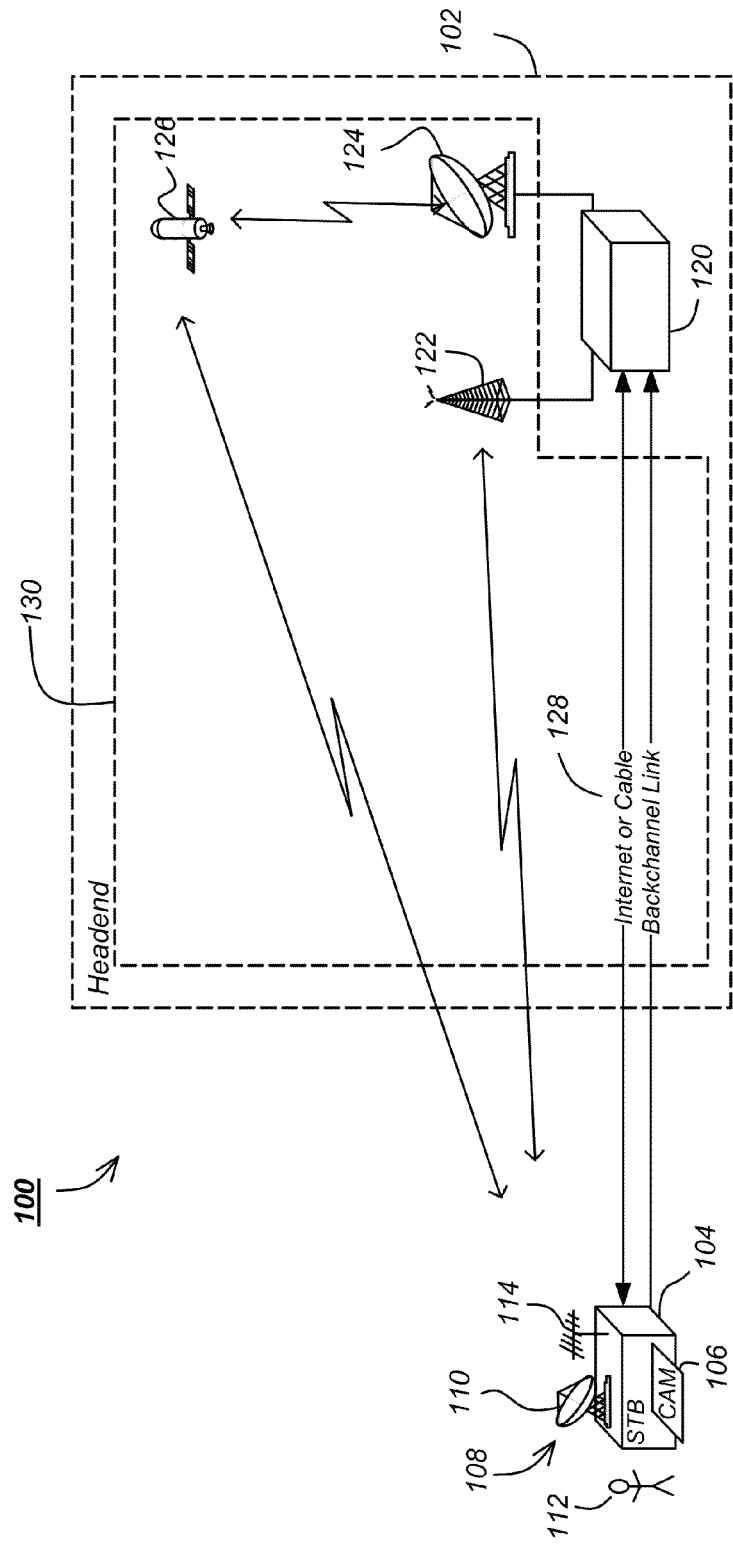
FIG. 1 is a diagram illustrating an exemplary media program distribution system.

FIG. 1 is a diagram illustrating an exemplary media program distribution system 100. The system 100 includes three architectural elements (1) one or more service providers (hereinafter referred to as a headend) 102, (2) one or more receivers or set top boxes (STB) 104, and (3) a conditional access module (CAM) 106 associated with each STB 104. The headend 102 broadcasts or transmits media programs to one or more receiver stations 108, each of which includes one or more STBs 104.

The headend 102 comprises a control center 120 communicatively coupled to the receiver station 108 via a data communication network 130. In the preferred embodiment, the data communication network 130 comprises the Internet. However, in addition to the Internet, the data communication network may also or alternatively comprise a cable link, a terrestrial communication system, a satellite communication system, or even a cellular or satellite telephone system. The terrestrial communication system includes a terrestrial transmit antenna 122 communicatively coupled to the control center 120 that transmits a signal to a terrestrial receive antenna 114 communicatively coupled to the STB 104. The satellite communication system includes an uplink antenna 124 communicatively coupled to the control center 120 transmitting an uplink signal, one or more satellites 126 to receive the signal from the uplink antenna 124, and a downlink antenna 110 for receiving the uplink signal transponded by the satellite 126.

Figure 2:
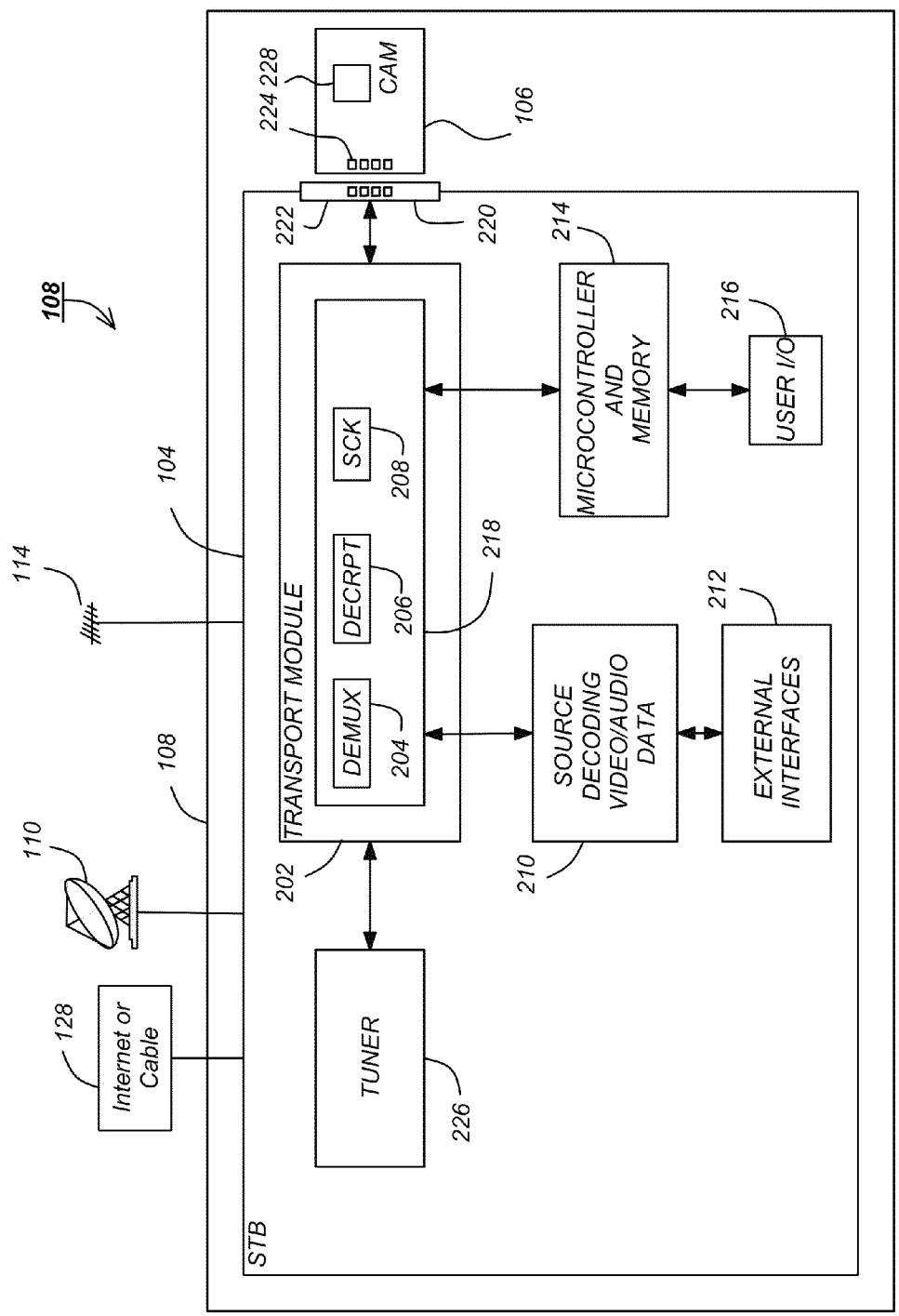
FIG. 2 is a diagram illustrating additional features of the receiver station, showing the physical, electrical, and functional interface between the set top box and the conditional access module.

FIG. 2 is a diagram illustrating additional features of one embodiment of the receiver station 108, showing the physical, electrical, and functional interface between the STB 104 and the CAM 106. A signal having media programs and other data is provided by the terrestrial receive antenna 114, the downlink antenna 110, or via the Internet or Cable 128, to the tuner 226. The tuner 226 receives the signal and provides the received signal to the transport module 202. In one embodiment, the received signal comprises digital data for information carried on a plurality of channels that can be multiplexed with other channels by a frequency-division multiple access (FDMA), time-division multiple access (TDMA) or code-division multiple access (CDMA) scheme.

The transport module 202 includes a processor 218 that implements a demultiplexer 204, a decryptor 206, and a secure communications kernel (SCK) 208. The demultiplexer 204 demultiplexes the received signal using the appropriate demultiplexing scheme to recover the information for the channel of interest, which is selected, for example by the user I/O device 216 via the microcontroller and memory 214. For example, if the received signal is a TDMA-multiplexed signal having a plurality of data packets, each identified with a particular channel, the demultiplexer 214 retrieves the packets identified with the channel assembles them in the appropriate order. If the received signal is CDMA-multiplexed signal having a data packets distinguished by a code, the demultiplexer 214 retrieves the data packets identified with the channel using the code, and assembles those data packets in order. If the received signal is FDMA multiplexed, the demultiplexer 204 retrieves the data associated with the frequency band associated with the channel. Typically, the transport module is implemented on a chip (hereinafter alternatively referred to as a transport chip). Preferably, the transport module 202 is a secure chip that is impervious to reverse engineering or inspection without permanently damaging the chip.

Each transport module 202 is uniquely identified by a globally unique transport chip identifier that is associated with the transport module 202 at manufacture. Since each STB 104 typically includes only one transport module 202 and the transport module is integrated within the electronic circuits of the STB, the transport module ID also uniquely identifies the STB 104 as well. Hence, hereinafter, the transport chip identifier will also alternatively be referred to as the STB identifier or STB ID.

Each transport module 202 also stores at least one transport module secret key. That secret key is known to the headend 102 and can therefore be used to securely transmit information to the STB 104.

Typically, the data packets received by the tuner 226 and demultiplexed by the demultiplexer 204 are encrypted before transmission to the receiver station 108 to assure that the media program is provided only to subscribers 112 at receiver stations 108 that are authorized to receive the media program. The task of decrypting the media program before presentation to the subscriber 112 is accomplished by the decryptor 206. In the illustrated embodiment, the decryptor 206 is implemented by the processor 218 in the transport module 202, however, the decryptor 206 may be implemented in a separate processor in the transport module 202, in a processor separate from the transport module 202 within the STB 104, or within the CAM 106. Further, the decryption operations may also be shared among processors disposed in the STB 104, transport module 202, or CAM 106.

Once decrypted, the media program is provided to the source decoding module 210, where any source encoding operations are decoded. In one embodiment, the source decoding module includes one or more forward error correction (FEC) decoders, and one or more motion picture experts group (MPEG) decoders. Once decoded, the media program is in a form that can be provided to external devices such as televisions (in the case of an audiovisual media program), audio system (in the case of an audio media program) or a computer system, which can accept and process audiovisual data, audio data, computer program data for use and/or presentation to the user.

The transport module processor 218 also implements a secure communications kernel (SCK) 208. The SCK 208 manages communications between the CAM 106 and the transport module 202 and all communications with the headend 102. All such communications are performed via one or more secure channels, that are established and maintained by enforcing a number of security policies such as session pairing, as will be further described below.

Messages to and from the headend 102 are collectively referred to as entitlement messages. Entitlement messages can be pushed by the headend 102 (e.g. transmitted from the headend 102 without being requested by the STB 104, or pulled by the STB 104 transmitted from the headend 102 in response to a request from the STB 104).

The receiver station 108 also includes a CAM 106, which performs at least some of the operations that are necessary for the decryption of the media program. The CAM 106 communicates data with the STB 108 via a plurality of electrical connectors 222 on the CAM 106 which contact electrical connectors 224 disposed in the STB 104 when the CAM 106 is inserted into the STB 104. For example, in one embodiment, the CAM 106 is a smart card having a plurality of electrical connectors and the STB 104 includes a smart card reader having electrical connectors that contact the CAM electrical connectors 224 when the CAM 106 is inserted in or otherwise interfaced with the STB 104. Data can be communicated between the STB 104 and the CAM 106 in other ways as well, including wireless communication techniques such as radio-frequency identification (RFID). In the illustrated embodiment, the CAM 106 is disposed in a separate housing and is physically distinct from the STB 104, and is removably communicatively coupleable with the transport module 202, and hence, the STB 104 (that is, it communicates data when physically coupled and does not communicate data when it is physically removed). However, this need not be the case, as the CAM 106 may alternately be a device such as a chip or a collection of devices that are physically integrated with the STB 104 (for example, within the SCK 208) and irremovable.

To assure that only those who subscribe to the service are provided with media programs, the service providers typically encrypt the media program M with a control word CW, thus producing and encrypted program $E_{CW}[M]$, and transmit the encrypted media program $E_{CW}[M]$ and an encrypted version of the control word E[CW] to the receiver station 108. The STB 104 receives both the encrypted program $E_{CW}[M]$ and the encrypted control word E[CW]. The transport module 202 analyzes the incoming data stream and passes the encrypted control E[CW] to the CAM 106, which decrypts the control word CW and returns the decrypted control word CW to the decryptor 206 or similar device in the transport module 202. The security module 204 then uses the control word CW to decrypt the encrypted media program $E_{CW}[M]$ to produce the media program M for presentation to the subscriber. This system assures that only those who are in possession of a valid CAM 206 can receive and decode media programs. However, it does not prevent the use of the CAM 206 in any other STB 104. Hence, if the CAM 206 is compromised or duplicated, unauthorized access to media programs is possible. Further, the processes described above are typically used to encrypt all or virtually all of the media programs transmitted to the STB 104. If a pay-per-view (PPV) service is desired (wherein the subscriber pays a separate fee for one or more viewings of a media program, the CAM 106 and the STB 104 perform additional functions (described further below) to provide this service, as further described below.

Like the transport module 202, each CAM 106 is associated with a globally unique identifier (hereinafter, CAM ID). In a preferred embodiment, the CAM ID is determined at manufacture, and cannot be changed. Each CAM 106 may also store at least one secret key that is used to securely communicate information from the headend 102 to the CAM 106.

As is discussed further below, before transmission to a receiver station 108 media programs (or portions of media programs) are encrypted according to a content encryption key (CEK). The CEK is encrypted with the transport module 202 secret key to produce an encrypted content encryption key (ECEK) that is transmitted to the STB/CAM pair. The ECEK may then be then associated with the media program and stored in the STB 104 and/or the CAM 106 for later use.

An ECEK generated for a particular media program and STB/CAM pair can be used to decrypt only the media program for which it was generated, and is usable only with the STB/CAM pair that it was generated for. That is, if the incorrect CAM 106 is used with the STB 104, the media program will not be properly decrypted. This pairing is enforced by the transport module 202 secret key and the strong encryption used to distribute the license encryption key (LEK).

The CAM 106 is also responsible for key management activities such as accessing and viewing the LEK and CEK, license validation activities such as reviewing the contents of the license file, assuring that the STB is authorized to view the content, and enforcing the binding a of license to a particular media program or portion of a media program and key by assuring that the ELF is decryptable with only the correct LEK. The CAM 106 can also enforce "play windows". This allows the system to download a popular movie while concealing it from the user until the movie's "play window" (e.g. midnight on a particular night as a special event) while evening out broadcast demands and avoiding last minute downloads to support user requests. The CAM 106 decrypts the ECEK using the LEK to produce the CEK and passes the CEK to the STB 104 via the encrypted communications channel enforced by the SCK 208.

The CAM 106 also stores the following state information, which can be provided to the headend 102 upon request:
  (a) Return counts if the HE requests it.
  (b) LEK Index
  (c) Content ID
  (d) Current Number of User Views (for each content ID)
  (e) Number of Permitted View (for each content ID)
  (f) End time of viewable period once CAM validates ELF, (or an infinite time) (for each content ID)
  (g) HE time
  (h) STB time
  (i) CAM Time
  (j) Purchased date
  (k) Purchase/Rental model In the above embodiment, the CAM 106 is illustrated and described as being removably coupleable to the STB 104. In other embodiments, the CAM 106 is not physically disposed at the receiver station 108 nor physically coupleable to the STB 104, but rather, disposed at the headend 102 or in another facility distinct from the receiver station 108 and headend 102. For example, a plurality of CAMs 106 may be disposed in a facility separate and distinct from the receiver station 108 and the headend 102, with each of the plurality of CAMs 106 associated with one of the fielded STBs 104. The plurality of CAMs 106 can be implemented by a plurality of separate processing entities, each with an associated processor and memory, and each processor independently executing instructions stored in the associated memory. For example, a "farm" of smart cards, each smartcard implementing the CAM 106 functionality and paired with an associated STB 104, may be implemented, disposed in either one or a plurality of locations.

Alternatively, in an embodiment comprising a plurality of virtual CAMs, some or all of the CAMs 106 may be implemented by a single processor and associated memory, executing instructions to independently emulate the functionality of each of the plurality of CAMs 106.

Headend Architectural Overview

Figure 3:
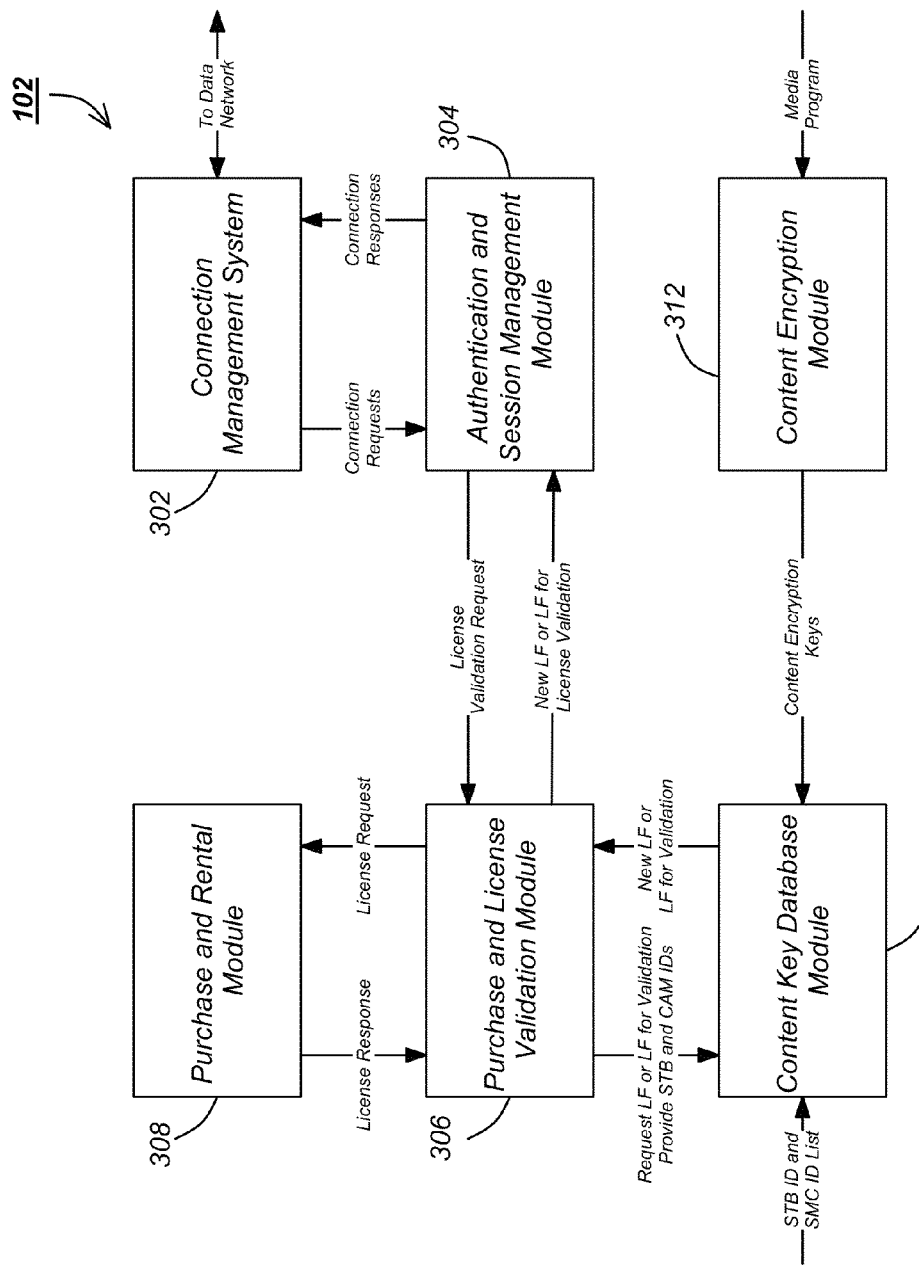
FIG. 3 is a diagram illustrating architectural elements of the headend.

FIG. 3 is a diagram illustrating architectural elements of the headend 102. The headend 102 includes a content key database (CKD) module 310, a purchase and license validation (PLV) module 306, an authentication and session management (ASM) module 304.

The ASM module 304 stores headend 102 private keys, CAM public keys, and session keys that are used to implement communications between the headend 102 and the STB 104. The ASM module 304 authenticates fielded CAMs 106, establishing a secure channel for communicating with the CAM, and managing session keys used to encrypt data transmitted over the secure channel. In one embodiment, the ASM module 304 is implemented by a server.

To view or otherwise use a media program, a license for that media program must first be granted by the headend 102 and transmitted to the STB/CAM that originated the request. Licenses are encrypted before being transmitted to the STB/CAM pair, using a license encryption key (LEK). Further, licenses are bound to a particular STB/CAM pair, and a license generated for one STB/CAM pair will not be useable on another STB/CAM pair.

The PLV module 306 manages the issuance and maintenance of LEKs to each of the STB/CAM pairs, accepts requests for new licenses and to renew existing but expired licenses (through the ASM module 304), validates that the subscriber is authorized to access the media program, and if so, provides the requested new or renewed license to the STB/CAM pair (again, through the ASM module 304). Licenses to record, view, or use the media program can be configured so that the expire and must be periodically validated by the headend 102. The expiration period can be set to any value, but preferably ranges from a few days to an unlimited period of time. Licenses to view or use media programs are stored in the headend 102 and may also be cached in the STB 104. In one embodiment, the PLV module 306 is implemented by a server.

The CKD module 310 contains a database of the identifiers of the transport module 202 (e.g. the STB IDs) and the CAMs 106 (e.g. the CAM IDs). In one embodiment, the STB ID and CAM ID information is obtained from the entities that fabricate the transport modules 202 and CAM 106. The CKD module 310 also stores transport module secret keys and CAM secret keys. The STB IDs, CAM IDs and secret keys are preferably encrypted before storage in the database, to further ensure security.

The CKD module 310 derives or obtains a unique content encryption key (CEK) that was used to encrypt a particular media program or portion of a media program. The CKD module 310 receives license file requests (and requests to re-validate existing licenses) from the PLV module 306, and in response, encrypts that CEK to produce an encrypted CEK (ECEK) so that it can be decrypted only by a particular STB 104/CAM 106 pair, thus binding the CEK to a particular STB/CAM pair. Hence, the media program cannot be viewed unless it is viewed using the appropriate STB 104 using the appropriate CAM 106. The CKD module 310 then generates a license file (or a revised license file, the request was for revalidation) having the ECEK. In one embodiment, the CKD modules is 310 is a high security server that is both physically and electronically secure.

In one embodiment, the algorithm used to encrypt the media program according to the CEK is a 128-bit AES in either Electronic Code Book (ECB) or Cipher Block Chaining (CBC) mode. Selection of the algorithm used to encrypt the media program according to the CEK depends upon the features supported by the decryptor 206 in the transport module 202. One CEK could be generated per movie, or the movie could be separated into segments or periods, with a different CEK required to decrypt each of the periods.

Referring again to FIG. 3, the ASM module 304 provides a communication interface between the STB/CAM pair and the headend 102 via the data communication network 130. The connection management system 302 accepts requests to establish secure connections between the STB/CAM pair and the headend 102 and forwards these requests to the ASM module 304. The ASM module 304 attempts to establish a secure communication channel between the STB/CAM pair, and provides a response back to the connection management system 302 which is forwarded to the STB/CAM. If a secure communications channel is established (e.g. by generating one or more session keys to be used for communications), those session keys are provided to the appropriate communicating entity. The establishment of the secure communications channel is described in further detail below.

Requests for a license to view a particular media program or to renew a license to view such a media program are received in the headend 102 from the STB/CAM and the licenses are responsively transmitted from the headend 102 to the STB/CAM via the secure communications link. The ASM module 304 accepts such requests, and provides the request to the PLV module 306. The PLV module 306 validates that the subscriber making the request is authorized to view the media program that is the subject of the request. This is accomplished by transmitting the license request to a purchase and rental module 308. The purchase and rental module 308 accesses the subscriber's account and determines performs the accounting functions necessary to assure that the requesting subscriber is only granted access to media programs that have been paid for. Hence, the purchase and rental module 308 performs any necessary account debiting and inspection, and if the subscriber's account permits, sends a license request back to the PLV module 306. Typically, the purchase and rental module 308 is part of an existing billing system managed by the media program provider that maintains the credit and payment history of the subscriber's account.

Upon receipt of the license request from the purchase and rental module 308, the PLV module 306 provides a license request to the CKD module 310. The license request includes the STB ID and CAM ID associated with the requesting subscriber, and a content ID identifying the media program of interest. The CKD module 310 accepts the license request, and generates a license file (LF). The license file includes the key that is needed to decrypt the requested media program (the CEK), encrypted with the secret key of the transport module 202 to produce the ECEK. The LF with the encrypted content encryption key (ECEK) is then encrypted with the license encryption key (LEK) and transmitted from the CKD module 310 to the PLV module 306. The PLV module 306 forwards the encrypted license file (ELF) to the ASM module 304, which sends the ELF to the STB/CAM using the established secure communications channel.

Enabling the STB to Receive Media Programs

A receiver station 108 must be enabled before it can be used to view or otherwise use a media program. Generally, this is accomplished by the generation and transmission of a license encryption key (LEK) to the receiver station 108. The LEK is generated by the headend 102 in response to a registration request from the receiver station 108 that includes a globally unique STB ID and a globally unique CAM ID. The LEK is then encrypted according to a CAM key stored in the CAM 106 before transmission. The CAM 106 receives the encrypted LEK, decrypts it using the CAM key, and stores the LEK for later use in decrypting licenses transmitted from the headend to the receiver station 108.

Figure 4:
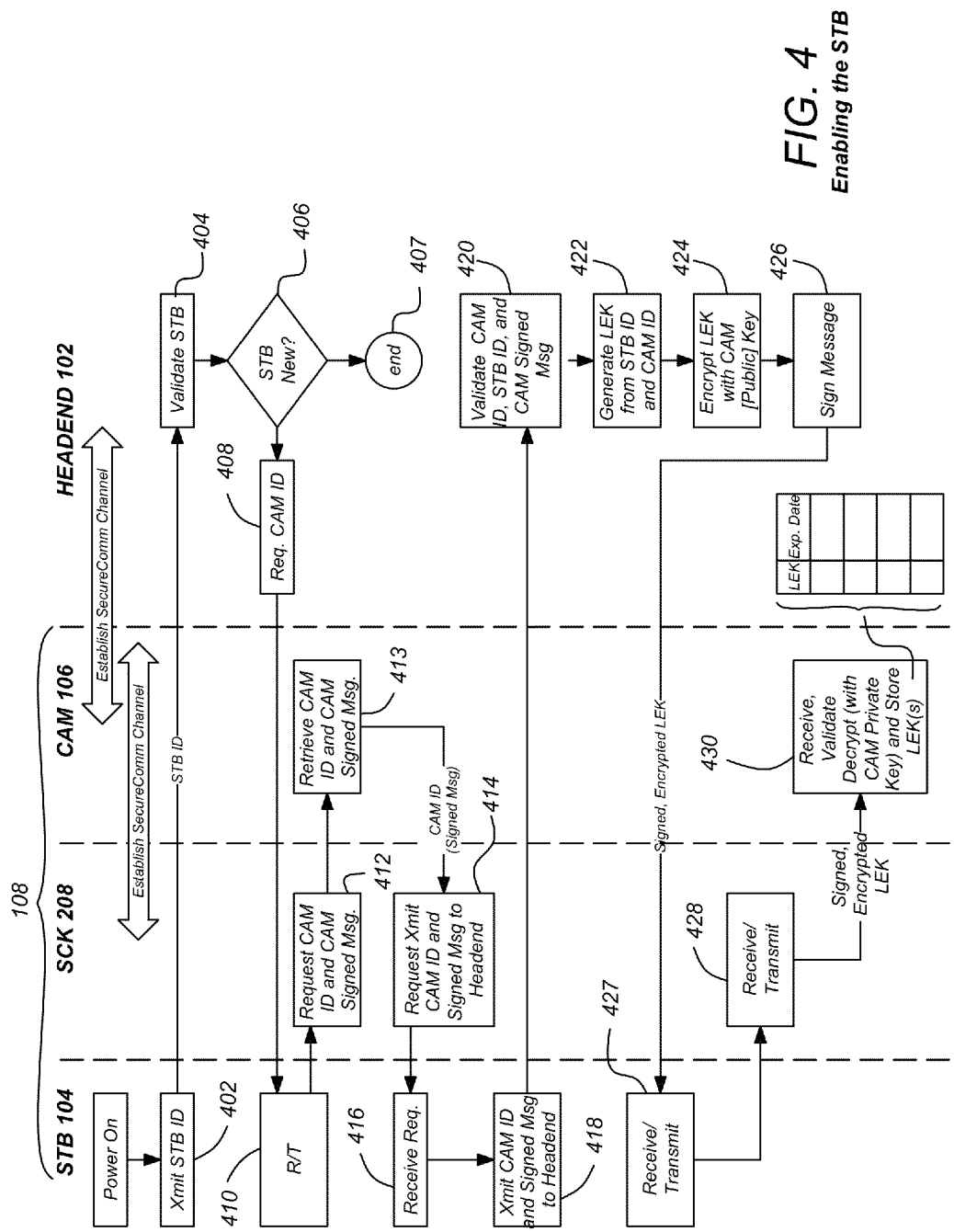
FIG. 4 presents exemplary method steps that can be used to enable the receiver station to receive and present media programs.

FIG. 4 presents further details regarding the enablement of a receiver station 108 to receive and present media programs. In block 402, the STB is powered on for the first time. Upon power on, the CAM 106 establishes a secure communication channel with the headend 102. Then, a secure communication path is established between the CAM 106 and the SCK 208. This is accomplished as described below.

Establishing Secure Communication Channels

As described above, a secure channel is established between the CAM 106 and the headend 102 and between the CAM 106 and the SCK 208. These secure channels provides a means to securely establish a symmetric key used to encrypt future messages.

The secure channels are established and used according to a secure message protocol (SMP) that is based on asymmetric RSA cryptography for initiating a secure channel, and the use of AES symmetric session keys for secure messaging during subsequent operations. The SMP provides authentication, data integrity, and confidentiality. Regarding authentication, the CAM 106 authenticates the headend 102 and the headend 102 authenticates the CAM 106. Data integrity is provided because the CAM 106 and the headend 102 ensure that the data being received from the other entity actually came from its claimed source in the correct sequence and has not been altered. And finally, confidentiality is assured because, when the SMP is used, confidential data is not viewable by an unauthorized entity.

The secure channel is needed primarily for communications between the headend 102 and the CAM 106. While it is possible to establish a "virtual" secure channel between the headend 102 and the CAM 106 by establishing a secure channel between the headend 102 and the SCK 208 and one from the SCK 208 to the CAM 106, this is not preferable, as it is not as secure as a secure channel between the headend 102 and the CAM 106. That's because a compromise of the SCK 208 would endanger the security of the virtual secure channel between the headend 102 and the CAM 106, but it would not endanger the security of a secure channel between the headend 102 and the CAM.

Initiating the secure channel between the headend 102 and the CAM 106 is accomplished in two stages. The first stage is the entity authentication stage, in which the CAM 106 and the headend 102 check the authenticity of the other party by verifying the signature of a challenge sent to the other party, and the second stage is session key establishment, in which the two parties establish symmetric session keys for subsequent secure messaging.

The CAM 106 includes RSA key pair ($HE_{CAMenc\_pub}$ and $CAM_{HEsig}$) that is personalized within at manufacturing time. Each CAM 106 also stores a headend 102 public key ($HE_{CAMsig\_pub}$) used for communicating with each CAM 106. Since these keys are established in a secure personalization facility, the issued keys need not be validated using certificates. With the exception of GET CHALLENGE step, each message is encrypted with the public key of the receiving entity and signed with the private key of the sender.

Figure 5:
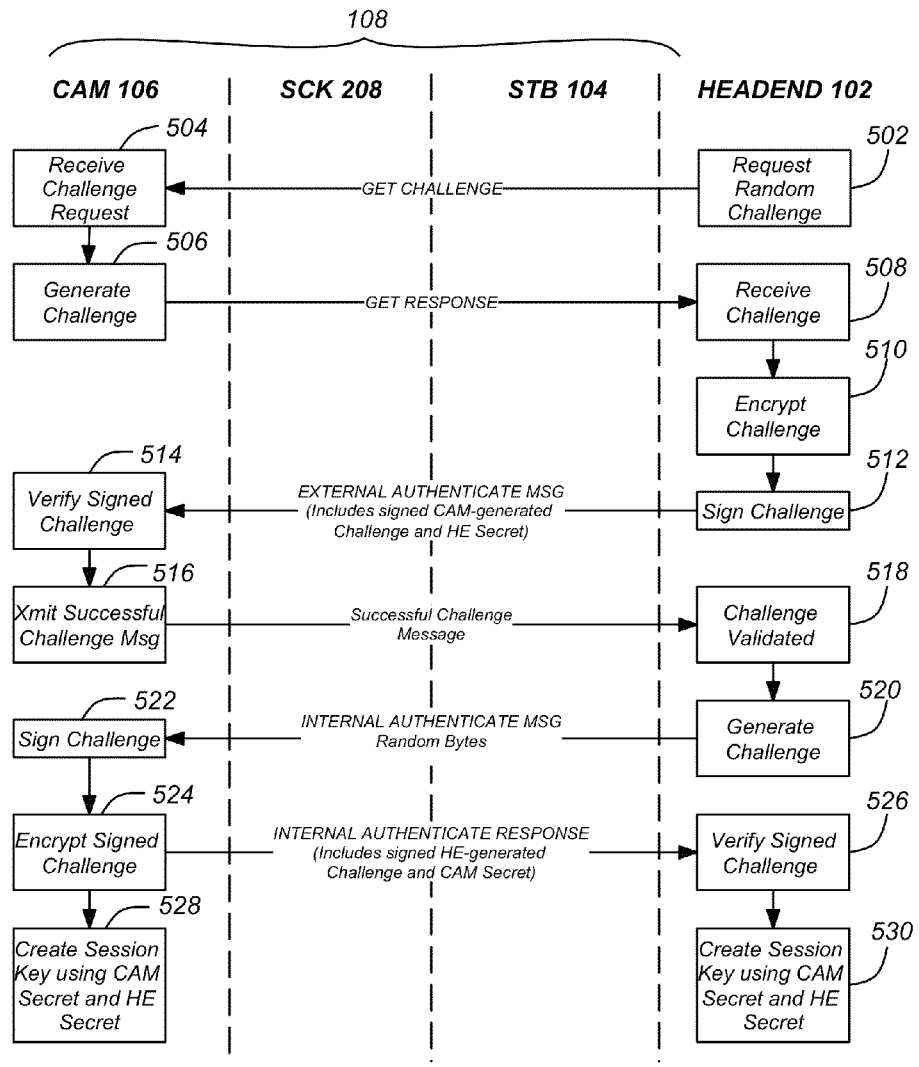
FIG. 5 is a diagram depicting the establishment of a secure channel between the CAM 106 and the headend.

FIG. 5 is a diagram depicting the establishment of a secure channel between the CAM 106 and the headend (HE) 102. Although all communications between the CAM 106 and the headend 102 are accomplished via the SCK 208, for purposes of simplification, the intercession of the SCK 208, while described below, is not illustrated in FIG. 5.

Initially, the following keys are stored in the CAM 106:
HE-CAM signature verification public key ($HE_{CAMsig\_pub}$);
CAM-HE signature private key ($CAM_{HEsig}$)
HE-CAM encryption public key ($HE_{CAMenc\_pub}$)
CAM-HE decryption private key ($CAM_{HEenc}$)
CAM-HE session secret ($CAM_{Heses\_sec}$)

The secure channel can be established using the secure message protocol in four phases.

1. GET CHALLENGE—In the first phase, the headend 102 requests a random challenge from the CAM 106 and the CAM 106 responds by returning a signed random challenge. This is shown in blocks 502-506 and may be accomplished as follows:

The headend (HE) 102 creates a plaintext GET CHALLENGE action message and sending it to the SCK 208. The SCK 208 then sends the GET CHALLENGE message to the CAM 106 by issuing a SEND HEADEND MESSAGE ISO command in plaintext. The CAM 106 generates a response to the random challenge. The SCK 208 retrieves the response by issuing a GET RESPONSE ISO command, and sends the response to the HE 102.

2. EXTERNAL AUTHENTICATE—In the second phase, the HE 102 signs the CAM 106 challenge and returns it to the CAM 106. This is shown in blocks 508-512. The CAM 106 can then verify that the HE 102 signed the challenge just returned in the GET CHALLENGE command as shown in block 514. This may be accomplished as follows:

The HE 102 composes a data block with the following structure:
  Data block[0]=0x6A (Pad Start)
  Data block[1 . . . 66]=Random data
  Data block[67 . . . 98]=HE Secret (32 bytes of random data)
  Data block[99 . . . 106]=CAM 106 challenge response (from GET CHALLENGE)
  Data block[107 . . . 126]=SHA-1 hash of Data block (Hash is over Data block[1 . . . 106])
  Data block[127]=0xBC (Pad End)

The HE 102 then encrypts the data block using RSA 1024 with $CAM\text{-}HE_{enc\_pub}$ key as shown in block 510. The HE 102 then signs the data block using RSA 1024 with $HE\text{-}CAM_{sig}$ key, creates an EXTERNAL AUTHENTICATE message with the encrypted data block, and sends the EXTERNAL AUTHENTICATE message to the SCK 208 as shown in block 512. The SCK 208 sends the EXTERNAL AUTHENTICATE message to the CAM 106 using the SEND HEADEND MESSAGE ISO command in plaintext.

The CAM 106 verifies the data block using RSA 1024 with $HE\text{-}CAM_{sig\_pub}$ key and decrypts the data block using RSA 1024 with $CAM\text{-}HE_{enc}$ key. Next, the CAM 106 verifies the data block by assuring that (1) data block[99 . . . 106] matches random data it generated, and (2) the calculated SHA-1 hash matches hash in Data block[107 . . . 126] as shown in block, as shown in block 514.

The CAM 106 retains the HE secret (see above), and returns the EXTERNAL AUTHENTICATE message status to the SCK 208 via GET RESPONSE ISO command in plaintext as shown in block 516. The SCK 208 then sends the EXTERNAL AUTHENTICATE response message to the HE 102.

3. INTERNAL AUTHENTICATE—The HE 102 sends the CAM 106 a signed random challenge. The CAM 106 signs and encrypts this challenge and returns it to the HE 102. The HE can then verify that the CAM 106 signed the proper challenge. This may be accomplished as follows:

The HE 102 generates an INTERNAL AUTHENTICATE message using 8 random bytes in plaintext as a data block and sends the INTERNAL AUTHENTICATE message to the SCK 208 as shown in block 520. The SCK 208 receives the INTERNAL AUTHENTICATE message and sends it to the CAM 106 using the SEND HEADEND MESSAGE ISO command in plaintext. The CAM 106 receives the INTERNAL AUTHENTICATE message and in response, composes a data block with the following structure, as shown in block 522:

Data block[0]=0x6A (Pad Start)
Data block[1 ... 66]=Random data
Data block[67 ... 98]=CAM Secret (32 bytes of random data)
Data block[99 ... 106]=HE 102 generated random data
Data block[107 ... 126]=SHA-1 hash of the data block (hash is over Data block[1 ... 106])
Data block[127]=0xBC (Pad End)

The CAM 106 then encrypts the composed data block using RSA 1024 with HE-CAM$_{enc\_pub}$ key, signs the data block using RSA 1024 with the CAM-HE$_{sig}$ key, and creates an INTERNAL AUTHENTICATE RESPONSE message with the signed encrypted data block, as shown in block 524.

The SCK 208 retrieves the signed encrypted Data block by issuing a GET RESPONSE ISO command. The SCK 208 sends the INTERNAL AUTHENTICATE RESPONSE message to the HE 102.

As shown in block, the HE 102 verifies the data block using RSA 1024 with the CAM-HE$_{sig\_pub}$ key and decrypts the data block using RSA 1024 with HE-CAM$_{enc}$ key.

Next, the HE 102 verifies the data block by assuring (1) that data block[99 ... 106] matches random data it generated, and (2) that the calculated SHA-1 hash matches hash in data block [107 ... 126]. This is shown in block 526.

4. SESSION KEY ESTABLISHMENT—Both the he 102 and the CAM 106 generate AES session keys using the random challenges and an algorithm known to both entities. In one embodiment, the HE 102 and CAM 106 both derive the 128 bit AES key to be used for the session (HE-CAM$_{ses}$ key), as shown in blocks 528 and 530. This is accomplished by creating a data block such that HE_Secret is concatenated with the CAM_Secret. Then, the data block is hashed using SHA-1 hash algorithm, and bytes 0-15 of the hash are used as the session key.

There is no specific command to terminate the secure session. The keys established during this process are used until the next time this command sequence is executed. The HE 102 is in control of managing how long a secure channel is maintained before establishing a new set of keys. The generated key will persist in the CAM 106 to allow the session to be maintained across power outages of the STB 104.

As described above, communications between the SCK 208 and the headend 102 CAM 106 are accomplished via the SCK 208. To protect against snooping the CAM/STB interface to obtain data, a secure communications channel is also established for communications between the CAM 106 and the SCK 208. This can be accomplished using techniques similar to those described above to establish the CAM 106-HE 102 secure communication channel. Before the secure channel is established, the CAM 106 includes the following keys:

SCK-CAM signature verification public key (SCK$_{CAMsig\_pub}$);
SCK-CAM signing private key (CAM$_{SCKsig}$);
SCK-CAM encryption public key (SCK$_{CAMenc\_pub}$);
SCK-CAM decryption private key (CAM$_{SCKdec}$); and
SCK-CAM session secret (CAM$_{SCKses\_sec}$)

The SCK 208 begins the establishment of the secure protocol by issuing a GET CHALLENGE ISO command to the CAM 106. The CAM 106 generates a response having eight random bytes in plain-text. The SCK 208 retrieves the response by issuing a GET RESPONSE ISO command. Using the response, the SCK 208 composes a data block having the following structure:

Data block[0]=0x6A (Pad Start)
Data block[1 ... 66]=Random data
Data block[67 ... 98]=SCK Secret (32 bytes of random data)
Data block[99 ... 106]=CAM challenge response (from GET CHALLENGE)
Data block[107 ... 126]=SHA-1 hash of Data block (the hash is over Data block[1 ... 106])
Data block[127]=0xBC (Pad End)

The SCK 208 then encrypts the Data block using RSA 1024 with the CAM$_{SCKenc\_pub}$ key. The SCK 208 then issues EXTERNAL AUTHENTICATE ISO command with the encrypted data block to the CAM 106. The CAM 106 decrypts the data block using RSA 1024 with the CAM$_{SCKenc}$ key. The CAM 106 verifies the decrypted data block by (1) determining if data block [99 ... 106] matches random data it generated, and (2) calculating a SH-1 hash and determining if the calculated hash matches decrypted data bock [107 ... 126]. If so, the CAM 106 retains the SCK 208 secret of 32 bytes of random data.

The SCK 208 then generates eight (8) random bytes, and issues an INTERNAL AUTHENTICATE ISO command with the eight random bytes as the data block in plain-text. The CAM 106 responds by composing a data block with the following structure Data block[0]=0x6A (Pad Start)
Data block[1 ... 66]=Random data
Data block[67 ... 98]=CAM Secret (32 bytes of random data)
Data block[99 ... 106]=SCK generated random data
Data block[107 ... 126]=SHA-1 hash of Data block (the hash is over Data block [1 ... 106])
Data block[127]=0xBC (Pad End)

The CAM 106 encrypts the data block using RSA 1024 with SCK$_{CAMenc\_pub}$ key, and the SCK 208 retrieves the encrypted data block by issuing a GET RESPONSE ISO command. The SCK 208 then decrypts the Data block using RSA 1024 with SCK$_{CAMenc}$ key and verifies the decrypted data block by (1) determining if data block[99 ... 106] matches random data it generated and (2) calculating SHA-1 hash and determining if the calculated hash matches decrypted data block [107 ... 126].

The SCK 208 and CAM 106 both derive a 128 bit AES key to be used for the session key (CAM_SCK$_{sess}$). This can be accomplished by defining a data block such that SCK_Secret is concatenated with the CAM_Secret, hashing the data block using SHA-1 and using bytes 0-15 of the hash as the session key. An INTERNAL AUTHENTICATE ISO command returns verification and key derivation status, and an INTERNAL AUTHENTICATE RESPONSE indicates that the session key has been successfully derived and verified. From that point, a secure channel has been established for communications between the SCK 208 and the CAM 106 via the secure channel session key (CAM_SCK$_{sess}$). A GET CHALLENGE ISO command can be used to revoke an established CAM_SCK$_{sess}$ key.

Henceforth, communications between the CAM 106 and the headend 102 as well as communications between the CAM 106 and the SCK 208 are encrypted.

A secure channel can also be established between the headend 102 and the SCK 208 (HE-SCK secure channel), allowing for secure messages to and from the SCK 208 and headend 102. This can be accomplished using the same techniques described above. The over an HE-SCK secure channel can be established either before or after the HE-CAM secure channel.

Returning to FIG. 4, the STB 104 transmits the STB ID (which may be the electronic ID of the transport module) to the headend 102 via the secure channel. The headend 102 receives the STB ID and validates that the provided STB ID refers to an STB 104 one that is deployed to subscribers, as shown in block 404. This is accomplished with reference to a table or other mapping between valid STB IDs and subscriber identities.

Block 406 determines whether the STB 104 associated with the received STB ID is new (e.g. has not been enabled by transmitting one or more LEKs to it). If the STB 104 is not new (e.g. it has already been enabled), processing ends as shown in block 407. If the STB 104 is new, the headend 102 transmits a message to the STB 104 via the secure channel requesting that the STB 104 transmit the identifier of any CAM 106 that is installed in the STB 104, as shown in block 408. The STB 104 receives this message. If a CAM 106 is not inserted into the STB 104, the subscriber 112 is prompted to insert a CAM 106 in the STB 104.

The request for the CAM ID is transmitted from the STB 104 to the CAM 106 via the SCK 208, as shown in block 412. The CAM 106 receives the request and retrieves the CAM ID, as shown in block 413. The CAM 106 signs the a message having the CAM ID using the HE-CAM signature verification public key ($HE_{CAMsig\_pub}$) and transmits the signed message. The signed message with the CAM ID is then provided to the headend 102 via the SCK 208 and STB 104 over the secure channel as shown in blocks 414-418.

The headend 102 validates that the received CAM ID and STB ID are both valid and a valid pair (that is, the CAM 106 associated with the CAM ID is approved for use with the STB 104 identified by the STB ID). If the CAM ID, STB ID are invalid, or if the CAM ID and STB ID are approved for use together, processing ends, and an error message is transmitted to the STB 104 for display to the user.

In embodiments wherein the CAM 106 is disposed at the headend 102 or elsewhere than the STB 104 or receiver station 108, steps 408-420 may not be required, as the headend 102 may simply look up the ID of the CAM 106 associated with the STB 104 from a database accessible to the headend 102.

If the STB ID an CAM ID are valid and are associated with one another, the headend 102 generates a license encryption key (LEK) as shown in block 422. The LEK may be randomly generated, or may be generated from the STB ID and CAM ID (e.g. the LEK may be generated as a hash of the STB ID that is exclusive OR'd with the CAM ID). As shown in blocks 424 and 426, the LEK is then encrypted with the CAM key, i.e. the HE-CAM encryption public key ($HE_{CAMenc\_pub}$), signed by the headend 102 using the HE-CAM signature verification public key ($HE_{CAMsig}$). The encrypted and signed LEK is then transmitted to the CAM 106 via the STB 104 and SCK 208 using the HE-CAM and SCK-CAM secure channels, as shown in blocks 427 and 428.

The CAM 106 receives the message, verifies the message sent by the headend 102 using the CAM-HE signature private key ($CAM_{HEsig}$), and decrypts the encrypted LEK using the CAM-HE decryption private key ($CAM_{HEenc}$), as shown in block 430. The LEK is then stored in the CAM 106 for later use.

In one embodiment, the LEK issued by the headend 102 is associated with an expiration date. Hence, the CAM 106 may be asked to store multiple LEKs, each with a different expiration date, as shown in FIG. 4.

In the exchange of information described above, communications between the CAM and the SCK are transceived over a secure communications channel in which messages are encrypted with the SCK-CAM session secret ($CAM_{SCKses\_sec}$). Further, communications between the CAM 106 and the HE 102 are transceived over a second secure communications channel in which messages are encrypted with the CAM-HE session secret ($CAM_{Heses\_sec}$). Hence, all of the foregoing communications passing from the SCK 208 to the CAM 106 are at least doubly encrypted (e.g. by the CAM-HE session secret ($CAM_{Heses\_sec}$) and the SCK-CAM session secret ($CAM_{SCKses\_sec}$).

Figure 6:
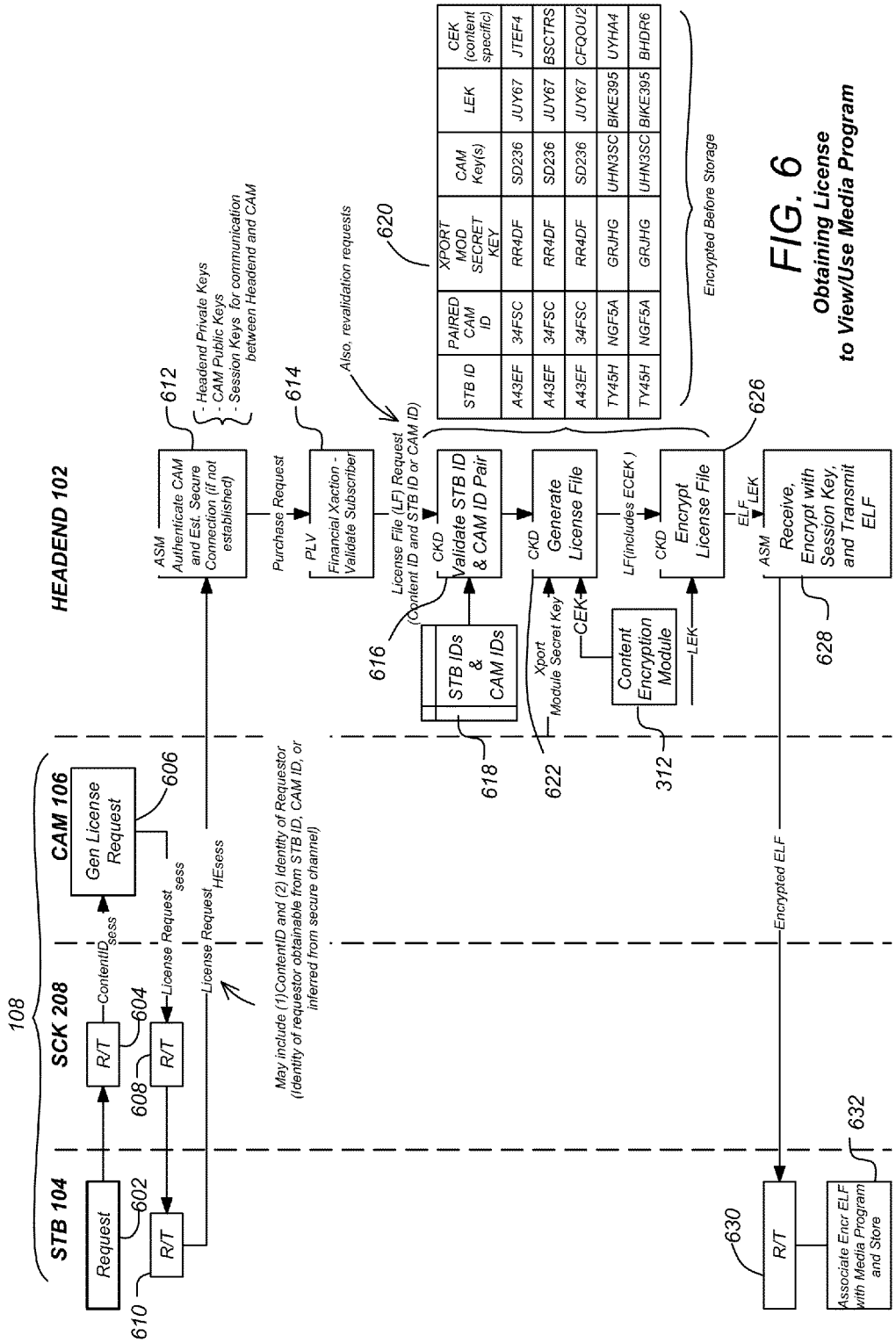
FIG. 6 is a diagram illustrating how a subscriber may obtain a license granting the right to view or otherwise use a media program.

Once the STB 104 has been provided with an LEK, it is enabled to request the licenses that are required to view media programs from the headend 102. FIG. 6 is a diagram illustrating one embodiment of how licenses to view the media program are transmitted to the STB 104.

In the foregoing embodiment, the LEK is transmitted to the CAM 106 and stored to enable the STB 104. The LEK may also be stored in the CAM 106 at the time of manufacture. In which case, the foregoing steps need not be undertaken.

Obtaining a License to View a Media Program

FIG. 6 is a diagram illustrating how a subscriber 112 may obtain a license granting the right to view or otherwise use a media program. First, in response to a subscriber 112 request to view a particular media program, the receiver station 108 transmits a license request to the headend 102. This can be accomplished by the subscriber 112 entering a media program request into the user I/O 216 of the STB 104 as shown in block 602. The media program request is accepted in the STB 104. The STB 104 generates a media request message having a Content ID identifying the requested media program to the CAM 106 via the SCK 208 using the CAM-SCK secure channel. The CAM 106 responds by generating a license request having the content ID and the CAM ID and communicating that request to the headend 102. The license request is transmitted to the headend 102 by transmitting it from the CAM 106 to the SCK 208 via the CAM-SCK secure channel, and then from the SCK 208 to the headend via the STB 104 using the CAM-HE secure channel.

The license request includes both a content ID and a CAM ID because the license that will be transmitted to the subscriber will only be decryptable with the CAM that has stored the appropriate license encryption key (LEK). However, since the license request is communicated over the CAM-HE secure channel (that is, it is encrypted by the CAM-HE session secret ($CAM_{Heses\_sec}$) before transmission to the headend 102, the identity of the CAM 106 making the request can be inferred from the request itself. That is, since the request can be decrypted only with the use of the appropriate session key, and the session key is associated with a particular CAM 106, the identity of the CAM making the request can be determined. Also, since the CAM and STB are presumably paired with one another, the identity of the CAM 106 making the request can also be determined from the STB ID. Hence, the license request may include the Content ID and the STB ID, and the headend 102 may determine which LEK is appropriate to use to encrypt the license by reference to a list mapping the STB ID to the CAM ID of the CAM 106 that presumably made the request.

Although not necessary to practice the method described herein, the CAM 106 may also sign the license request using the HE-CAM signature verification public key ($HE_{CAMsig\_pub}$).

Returning to FIG. 6, the headend 102 receives the license request, as shown in block 612. As described above with respect to FIG. 3, such requests are received by the ASM module 304. If the request was signed, the ASM 304 authenticates the request and validates that the license request was received from the CAM 106. The ASM 304 also decrypts the license using the CAM-HE session secret ($CAM_{Heses\_sec}$).

Next, the headend determines whether the license request is authorized. This can be accomplished by the PLV module 306 illustrated in FIG. 3. The PLV module 306 is responsible for managing license requests and granted licenses. It receives requests from the ASM module 304, which receives purchase and validation requests from CAMs 106 as described above.

The PLV module 306 receives new purchase requests and validates that a given subscriber is authorized to view the requested media program, as shown in block 614. Upon receipt of a purchase request, the PLV module 306 forwards the request to the purchase and rental module 308. The purchase and rental module 308 manages subscribers, completes financial transactions with the subscribers and external entities, completes any financial transactions, and enters the purchase request into the headend's billing system. If approved, the purchase and rental module 308 returns an authorization that the purchase was successful, and returns a license response indicating as such to the PLV module 306. If the purchase is not approved, the purchase and rental module 308 returns a license response indicating that the license request is not approved, and the PLV module 306 returns a failure status code to the CAM 106. A message indicating that the requested license was not approved is then generated by the STB 104.

If the purchase request was successful, the PLV module 306 sends a license request to the CKD module 310. The CKD module 310 generates a license file that includes the content encryption key (CEK) encrypted by a receiver key such as the transport module secret key described above. The resulting license file is encrypted according to the license encryption key (LEK) previously transmitted to the receiver station 108 and stored in the CAM 106 to produce an encrypted license file (ELF) that is transmitted to the receiver station 108. This process is further detailed below.

The PLV module 306 requests a connection with the CKD module 310. If there is an error during this connection, the CKD module 310 closes the connection. The CKD module 310 is able to handle a number of connections with the PLV module 306 at a time, as determined by the expected number of concurrent requests.

If there is no error, a license file request having the content ID, the CAM ID and the STB ID is transmitted from the PLV module 306 to the CKD module 310. In one embodiment, the STB ID need not be included with the license file request, as the STB ID can be determined by reference to the CAM ID using information stored in the database. The CKD module 310 compares the STB ID to STB IDs in the database 618. If the STB ID matching the STB ID of the request is not found, an error is returned to the PLV module 306. If an STB ID matching the STB ID sent with the request is found, the CKD module 310 compares the CAM ID in the request against the list of CAM IDs in the database 618. If a CAM ID matching the CAM ID sent with the request is not found, and error is returned to the PLV module 306. If a CAM ID matching the CAM ID sent with the request is found, the CKD module 310 validates that the STB/CAM pair is valid to verify that the STB and CAM associated with the STB and CAM IDs are authorized to be used together and not previously allocated to other elements. The CKD module 310 then generates a license file for the media program identified by the content ID for use with the CAM 106 identified by the CAM ID, as shown in block 622.

To assure that the media program is viewed only by authorized subscribers, the media program is encrypted according to a content encryption key (CEK). The content encryption (CE) module 312 provides the key that was used to encrypt the media program to the CKD module so that the CEK may be securely passed to authorized subscribers in the license file. As shown in block 622, the license file is generated by encrypting the CEK with the transport module secret key to create an encrypted content encryption key (ECEK). In addition to the ECEK, the license file may also include an expiration date and the content ID associated with the related media program, and other metadata. For example, the license file may also include usage policy information for the media program to which it is associated. The policy includes a usage model (rental, perpetual), the number of permitted views, license time constraints (license creation date, last validation date, and maximum re-validation time), or local storage constraints (whether the media program is permitted to be locally stored). In one embodiment, the license file includes:

(1) a first portion having an unencrypted header which is signed by the headend 102 for a particular CAM 106.

(2) a second encrypted portion, which may include the following:
   (a) LF Sequence number (which can be used to validate the LF)
   (b) LF Version number (which can be used to discriminate from expired LFs)
   (c) Current HE Date/Time
   (d) Content ID
   (e) License Creation Date/Time
   (f) License Start Date/Time
   (g) License Expiration Date/Time
   (h) Purchase/Rental model
   (i) Number of Permitted Views
   (j) Number of hours viewable once CAM 104 validates ELF, 0xFFFF if infinite
   (k) Number of crypto-periods (CPs) or ECEKs
   (l) P Length in number of bytes
   (m) CEK Initialization Vector
   (n) ECEK1
   (o) ECEK2
   . . .
   (p) ECEKn (The CAM 106 can store a plurality of ECEKs)
   (q) Length of Data Section (length of the section described below)
   (r) Application Data Section The license file is then encrypted with the (LEK) associated with the CAM 106 that was the source of the media program request to produce an encrypted license file (ELF), as shown in block 626. Since the LEK is associated with one and only one CAM 106, the LF is paired (e.g. is only usable with) that one CAM 106. The ELF includes an unencrypted header with an LEK index. The CAM 106 uses the LEK at that index to decrypt the ELF.

The ELF is provided to the PLV module 306 where it is stored. Licenses are returned to the requesting STB 104 via the SCK 208 upon validation that the requested media program may be presented by the STB 104 to the subscriber 112.

In one embodiment, the ELF is provided to the STB 104 for storage so that it may be easily retrieved when the subscriber 112 wishes to view a media program. In this embodiment, the PLV module 306 provides the ELF to the ASM module 628, which encrypts the ELF with the CAM-HE session secret ($CAM_{Heses\_sec}$) and transmits the ELF to the STB 104 via the connection management system 302. The STB 104 associates the encrypted ELF with the requested media program (for example using the content ID, and stores the ELF for later use when the user desires to view the media program. Caching encrypted license files in the STB 104 eliminates the need for the CAM 106 to keep the STB 104 media programs consistent with the license stored in the CAM 104, and reduces CAM 104 storage requirements. This simplifies the STB 104 software. If the media program is not stored in the STB 104, the ELF for that media content need not be stored in the STB either.

Alternatively, the ELF is stored in the PLV module 306 and only transmitted to the STB 104 when a request to view the media program is received. In this embodiment, the ELF is also provided by the secure channel as described above.

FIG. 6 includes a table 620 that illustrates the relationship between the STB ID, paired CAM ID, transport module secret key, CAM secret keys, LEK and CEKs. As shown, each STB 104 is with a CAM. For example, STB A43EF is associated with CAM 34FSC. Further, each STB is associated with a transport module secret key and each CAM is associated with a CAM secret key. For example, STB A43EF is associated with the transport module secret key RR4DF and CAM 34FSC is associated with CAM key SD236. Further, an LEK is also associated with the STB/CAM pair (generated as described in FIG. 4). For example, LEK JUY67 is associated with STB/CAM pair A43EF/34FSC. Although table 620 shows only one LEK associated with a particular STB/CAM pair, multiple LEKs, each with its own expiration time can be associated with an STB/CAM pair. Finally, each STB/CAM pair can be associated with one or more content-specific CEKs, each representing the CEK for a media program that the subscriber 112 requested and was granted access to. For example, if the subscriber 112 using STB A43EF and CAM 34FSC requests access to a first media program, CEK JTEF4 (which was used to encrypt the first media program) will be associated with the STB and the CAM in table 620. In the illustrated example, the STB/CAM pair A43EF/34FSC has been granted access to three media programs—those associated with CEKs JTEF4, BSCTRS, and CFQOU2.

Once the encrypted ELF has been stored by the STB 104, the receiver station 108 is prepared to play the requested media program. This can be accomplished by decrypting the ELF in the conditional access module 106 using the LEK to produce the ECEK, transmitting the ECEK to the receiver, decrypting the ECEK in the receiver using the transport module secret key to recover the CEK, and using the ECK to decrypt the encrypted media program.

Viewing the Media Program

Figure 7:
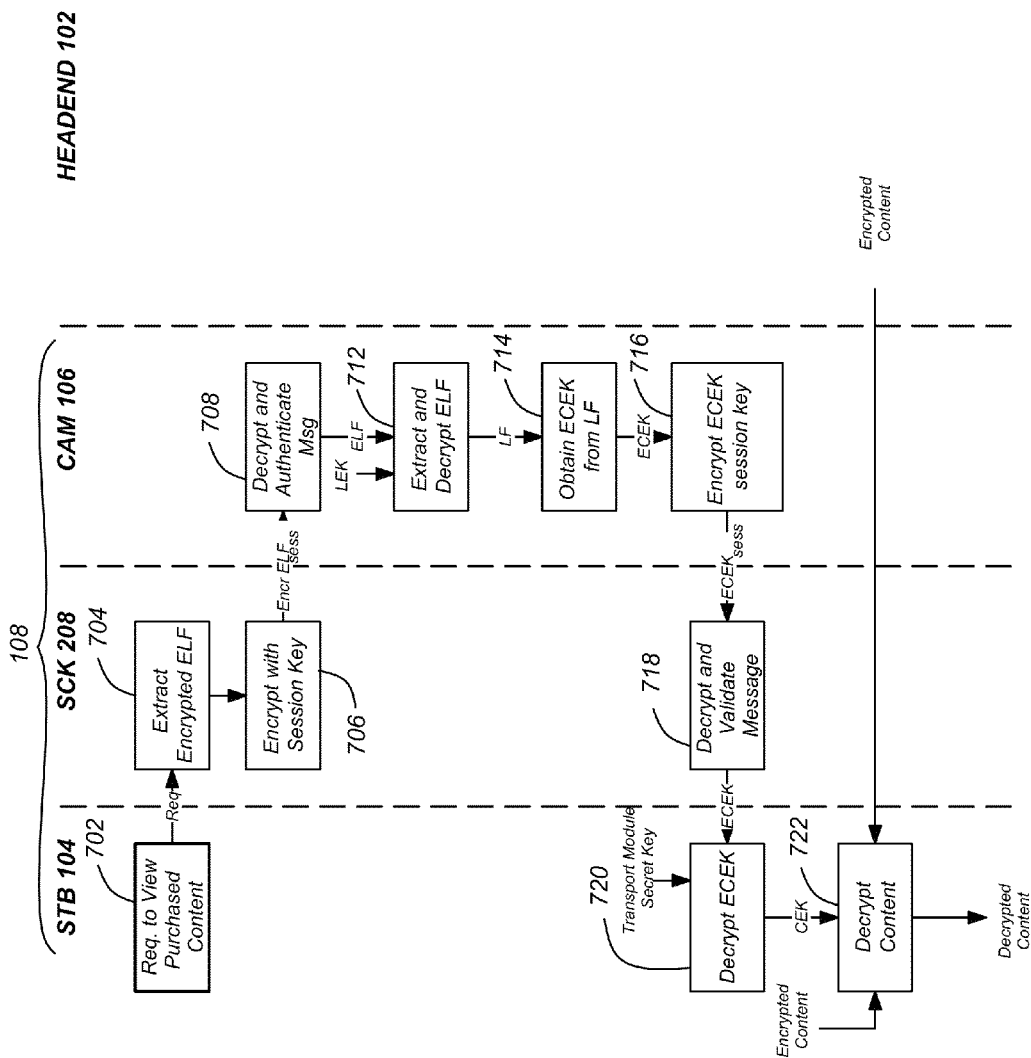
FIG. 7 is a diagram illustrating the steps that can be performed to play the media program.

FIG. 7 is a diagram illustrating the steps that can be performed to play the media program. As shown in block 702, the subscriber 112 makes a request to view a media program. The request includes an identifier for the requested media program. The STB 104 compares that identifier with the media program identifiers associated with stored ELFs to identify the STB 104 has an ELF for decrypting the requested media program. If the STB 104 does not have the appropriate ELF, the ELF is requested as described in FIG. 6. If the STB 104 determines that it has the ELF associated with the requested media program, a view request is transmitted to the SCK 208. The SCK 208 extracts the encrypted ELF from the STB 104 and communicates the encrypted ELF to the CAM 106 via the SCK-CAM secure channel by encrypting the encrypted ELF with the SCK-CAM session secret ($CAM_{SCKses\_sec}$). The CAM 106 receives the double-encrypted ELF, decrypts it with the SCK-CAM session secret ($CAM_{SCKses\_sec}$) and the CAM-HE session secret ($CAM_{Heses\_sec}$) to produce the ELF as shown in block 708.

The CAM 106 then uses the index to identify the LEK obtained as described in FIG. 4 to decrypt the ELF to produce the license file, as shown in block 712. The ECEK is then extracted from the license file, as shown in block 714, and transmitted to the SCK 208 via the SCK-CAM secure channel by encrypting the ECEK with the SCK-CAM session secret ($CAM_{SCKses\_sec}$). The SCK 208 receives the encrypted ECEK, decrypts it using the SCK-CAM session secret ($CAM_{SCKses\_sec}$), and passes the resulting ECEK to the STB 104, as shown in block 718. The STB 104 decrypts the ECEK using the transport module secret key to provide the content encryption key (CEK), as shown in block 720. The STB 104 uses the CEK to decrypt the media program, whether it be provided locally (e.g. previously stored in a hard disk drive or other device local to the STB 104 or received from the headend 102. This is illustrated in block 722.

The licenses granted to subscribers 112 to view media programs may be permanent, or may expire on an expiration date specified in the LF or elsewhere, depending on the business requirements of the provider of the media program provider or the broadcaster. The re-validation period can be set from a number of days to an indefinite period of time. To ease the burden on the media program distribution system, license validation is preferably performed on demand. That is to say, licenses are only renewed if the media program associated with the license is requested. A further license renewal policy can be implemented in which the subscriber is permitted one additional play, even when the license is expired if the STB 104 is incapable of communicating with the headend 102. This would assure that the subscriber 112 is not denied access to a media program because of communications difficulties. To assure that subscribers 112 are not encouraged to disconnect their STB 104 to obtain a free playing of a media program, the CAM 106 can keep track of the number of times a license file has expired, and yet, viewing of the media program has been permitted. If desired, the CAM itself can limit this number to a value with or without input from the headend 102.

If a request to view a media program does not require license re-validation, the PLV module 306 provides the ELF to the ASM module 304 for eventual delivery to the STB 104. If a request to view a media program requires license revalidation, the PLV module 306 transmits a re-validation request to the CKD module 310, and the revalidation request is handled by the CKD module 310 in the same way that a license request is handled, as described above. The result of the license re-validation process is a new ELF for the media program and possibly a new LEK for the CAM 106.

In one embodiment, the headend 102 controls how often the LF requires revalidation. Further, the headend 102 may request that the CAM 106 re-validate the one or more of the LFs cached in the STB 104 or stored in the PLV module 306. If an LF revalidation request is received by the headend 102, the headend 102 evaluates the LF along with the accompanying viewing data from the CAM 106 and decides if the LF will be allowed to be revalidated. Viewing data indicates, for example, if the media program or portion of a media program has been viewed and how many times. This could be necessary if digital rights management is being used and enforced by the headend 102. The headend 102 can change any policy (e.g. expiration date, number of views permitted, or whether the media program may be locally stored) in the LF before returning the revalidated LF to the CAM 106. Once the headend sends the ELF to the STB 104, changes to the ELF can only be made by CAM 106 but not by the headend 102.

Other System Security Features

In one embodiment, the CAM 106 includes a license use counter. Since the CAM 106 typically needs to validate the license each time the content is viewed, it is possible to count the number of times the content is played. Although licenses are typically not enforced based on number of views, it may be necessary to detect if a media program is viewed an unreasonable number of times during the life of a license. For example, a media program is typically allowed to be watched for 24 hours after it is watched the first time. However, if the license is validated 200 times, this may be an indication the clock chip on the STB 104 is not working or has been tampered with.

License use counters are be located and maintained in the CAM 106 not the LF. The CAM 106 can receive a message through the SCK 208 that a media program has been viewed according to any policy established by the STB 104. For example, the STB 104 can send a message to the SCK 208 when the media program is first played and again each time the media program has reached 75% completion. The license use counters can be passed back to the headend 102 with the LF during future license requests so the headend 102 can track these anomalies and make decisions on potential abuse.

The headend 102 creates the LF. View counters are updated in the CAM 106 as directed by the STB 104 or when LF validation requests are made. The CAM 106 contacts the headend 102 when it sees that the LF has expired or the permitted view count has been reached. In this case, the CAM 106 not will not return a key for viewing and will make a request back to the headend 102 and to request an LF revalidation. If the number of views has been reached, the STB 104 can notify the user so the user may make another purchase request. If the STB 104 is off-line, the STB 104 can notify the user to connect the STB 104 to enable a repurchase or LF revalidation as the case may be.

The system can also further increase security by use of trusted time. The sole source for the trusted time within the system is headend 102. The CAM 106 cannot be relied upon to be continuously powered, therefore it has no notion of time, and it is not possible for the CAM 106 to determine how long it has been powered off. Mechanisms to count clock cycles while powered have limited affectivity and are subject to external manipulation. Further, it is assumed that the time value from the STB 104 is not completely trusted since it may be possible to tamper with the time keeping chip.

The headend 102 may supply the time in signed messages sent to the STB 104. The CAM 106 could periodically request the current time from the headend 102 while the STB 104 in is online, and the time value, as determined from the CAM 106 can be periodically stored in non-volatile memory of the CAM 106 to prevent rollback of time. Time will be stored separately for the most recently reported values from the STB 104 and headend 102. In one embodiment, the latest cached CAM 106 time value will be reported to the headend 102 in all messages such as purchase and license validation requests, as an indication as to whether the CAM 106 or the message has been tampered with.

Validation of the STB 104 time value can be achieved by also storing this periodically and sending it back to the headend 102 during license requests. This allows the headend 102 to determine if the time keeper on the STB 104 is faulty or potentially tampered. Since a time value can be required when a license request is made, the headend 102 can choose to enforce that the time value in the request is current. Headend 102 enforcement of time ensures that the CAM 106 receives the latest time from the STB 104 since altering the value would mean a license request would be rejected by the headend 102.

The CAM 106 relies on the STB 104 time once the box is off-line. Other measures can be used such as media program duration and the number of times a media program has been played to ensure that time advances once the STB 104 is off line.

Finally, the CAM 106 may also enforce a viewable time limit describing the date and time after which the media program cannot be viewed. The CAM 106 receives the viewable time limit from the LF, and returns it to the headend with a LF validate message. When the viewable time limit is reached, the SCK 208 will not provide ECEKs to the STB 104 to permit the media program to be played. The SCK 208 manages this time and stops supplying ECEKs accordingly. Time is tracked to the accuracy possible using information from the STB 104 and headend 102 reported times. The SCK 208 stops delivering keys when the earliest of the Expiration Date or Viewable Time Limit has been reached.

As described above, the CAMs 106 paired with STBs 104 may also be disposed in locations remote from the STBs 104 or receiver stations 108. In such instances, the functionality of the CAMs 106 and the communication between the STB 104, SCK 208, headend 102 and the CAM 106 may remain unchanged from the embodiment in which the CAM 106 and STB 104 are disposed at the receiver station 108. Alternatively, the communications may change to reflect the location of the CAM 104 for that particular embodiment. For example, if the CAM 106 is disposed at the headend 102, there may be no need for the STB 104 or receiver station 108 to transmit both the STB ID and the CAM ID to the headend, as the headend may already have sufficient information to determine which CAM 106 is paired with the STB 104. As a further example, the establishment of the secure communications channel between the headend 102 and the CAMs 106 paired with each STB 104 may be implemented even if the CAMs 106 are disposed in the same secure facility as the headend 102 as described further below. However, in other embodiments, the establishment of the CAM 106/headend 102 secure communications channel may be unnecessary.

Figure 8:
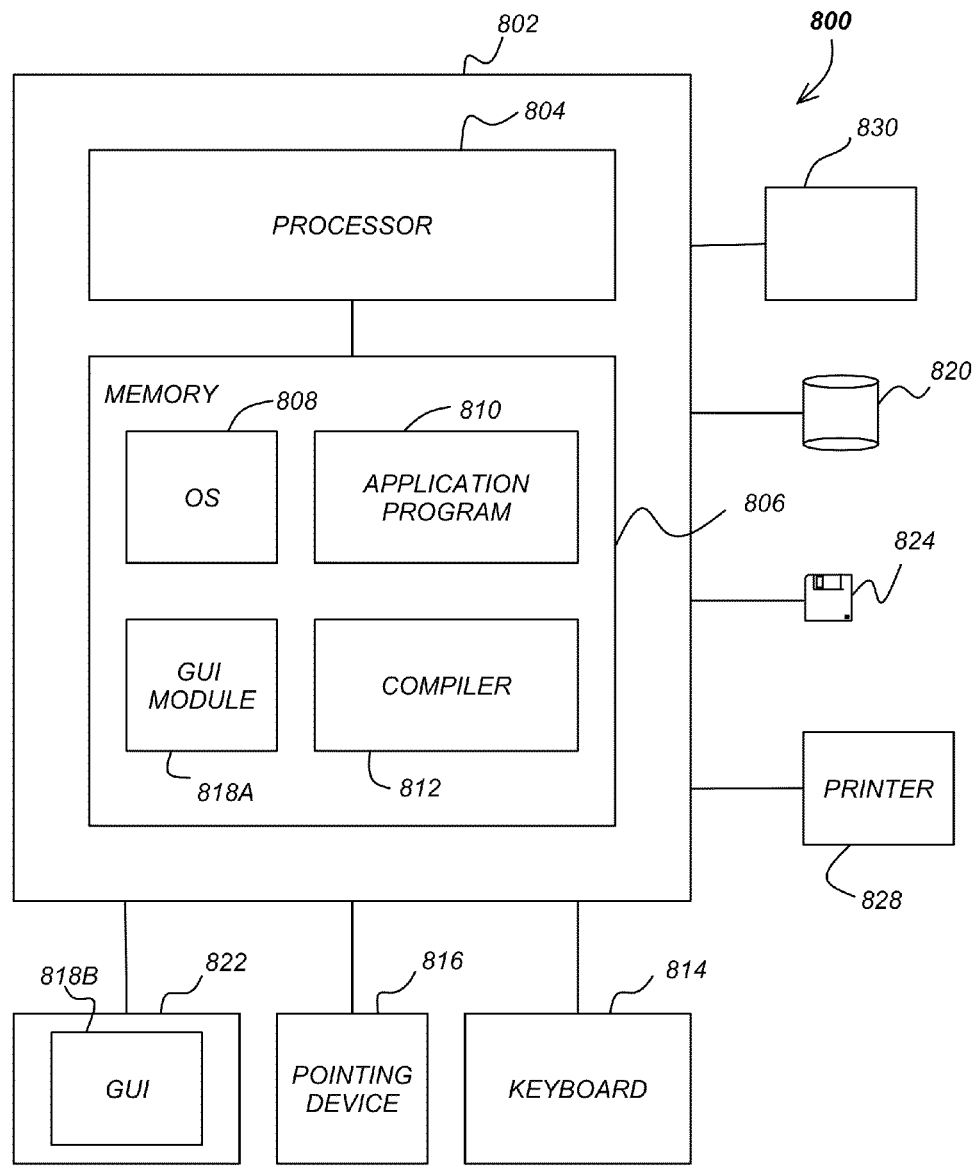
FIG. 8 illustrates an exemplary computer system that could be used to implement one or more elements of the media program distribution system.

FIG. 8 illustrates an exemplary computer system 800 that could be used to implement one or more elements of the media program distribution system 100. The computer 802 comprises a processor 804 and a memory, such as random access memory (RAM) 806. The computer 802 is operatively coupled to a display 822, which presents images such as windows to the user on a graphical user interface 818B. The computer 802 may be coupled to other devices, such as a keyboard 814, a pointing device 816, a printer, etc. Of course, those skilled in the art will recognize that any combination of the above components, or any number of different components, peripherals, and other devices, may be used with the computer 802.

Generally, the computer 802 operates under control of an operating system 808 stored in the memory 806, and interfaces with the user to accept inputs and commands and to present results through a graphical user interface (GUI) module 818A. Although the GUI module 818A is depicted as a separate module, the instructions performing the GUI functions can be resident or distributed in the operating system 808, the computer program 810, or implemented with special purpose memory and processors. The computer 802 also implements a compiler 812 which allows an application program 810 written in a programming language such as COBOL, C++, FORTRAN, Linux, or other language to be translated into processor 804 readable code. After completion, the application 810 accesses and manipulates data stored in the memory 806 of the computer 802 using the relationships and logic that was generated using the compiler 812. The computer 802 also optionally comprises an external communication device such as a modem, satellite link, Ethernet card, or other device for communicating with other computers.

In one embodiment, instructions implementing the operating system 808, the computer program 810, and the compiler 812 are tangibly embodied in a computer-readable medium, e.g., data storage device 820, which could include one or more fixed or removable data storage devices, such as a zip drive, floppy disc drive 824, hard drive, CD-ROM drive, tape drive, etc. Further, the operating system 808 and the computer program 810 are comprised of instructions which, when read and executed by the computer 802, causes the computer 802 to perform the steps necessary to implement and/or use the present invention. Computer program 810 and/or operating instructions may also be tangibly embodied in memory 806 and/or data communications devices 830, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of securely enabling the playing of a media program encrypted by a content encryption key (CEK), comprising:
   receiving a license request in a headend, the license request generated in response to a request for a license to view the media program and comprising a receiver identifier (STB ID);
   determining that the license request is authorized;
   encrypting the CEK with a receiver key associated with the received STB ID to produce an encrypted content encryption key (ECEK);
   generating a license comprising the encrypted content encryption key (ECEK);
   encrypting the license according to a license encryption key (LEK) to produce an encrypted license (ELF); and
   transmitting the encrypted license to a receiver station.

2. The method of claim 1, wherein the license request is received from the receiver station comprising a receiver, and wherein the STB ID is a globally unique receiver identifier and wherein:
   the license encryption key (LEK) is generated by the headend in response to a registration request from the receiver, the registration request comprising the STB ID wherein the license encryption key (LEK) is generated only if a conditional access module identified by a CAM ID is approved for use with the receiver identified by the STB ID;
   the generated LEK is encrypted according to a conditional access module key stored in the headend and associated with the conditional access module identifier (CAM ID);
   the encrypted LEK is transmitted to the conditional access module;
   the encrypted LEK is decrypted by and stored in the conditional access module.

3. The method of claim 2, wherein the encrypted license encryption key (LEK) is transmitted to the conditional access module via a secure kernel executing on a processor in the receiver, and wherein the secure kernel encrypts the encrypted LEK with a session key before forwarding the encrypted LEK to the conditional access module.

4. The method of claim 3, wherein the conditional access module is disposed remote from the receiver.

5. The method of claim 4, wherein the conditional access module is disposed at the headend.

6. The method of claim 1, wherein the receiver station comprises a receiver and the method further comprises:
   receiving the encrypted license in the receiver;
   decrypting the encrypted license in the conditional access module using the license encryption key (LEK) stored in the conditional access module to produce the encrypted content encryption key (ECEK);
   decrypting the ECEK in the receiver using the receiver key to produce the content encryption key (CEK); and
   decrypting the media program using the CEK.

7. The method of claim 1 wherein the received license request is authenticated before determining whether the license request is authorized.

8. An apparatus for enabling the playing of a media program encrypted by a content encryption key (CEK), comprising:
   a headend having a processor communicatively coupled to a memory storing instructions comprising instructions for:
      receiving a license request, the license request comprising a receiver identifier (STB ID) and generated in response to a media program request for a license to view the media program;
      encrypting the content encryption key (CEK) with a receiver key associated with the received receiver identifier to produce an encrypted content encryption key (ECEK), generating a license comprising the ECEK, and for encrypting the license according to a license encryption key (LEK) to produce an encrypted license; and
      transmitting the encrypted license to a receiver station if the license request is authorized.

9. The apparatus of claim 8, wherein the license request is received from the receiver station, the receiver station comprising a receiver and the receiver identifier is a globally unique STB ID, and wherein the instructions further comprise instructions for:
  generating the license encryption key (LEK) in response to a registration request from the receiver station, the registration request comprising the globally unique STB ID wherein the license encryption key (LEK) is generated only if a conditional access module identified by a CAM ID is approved for use with the receiver identified by the STB ID;
  encrypting the generated LEK according to a conditional access module key stored in the headend and associated with the conditional access module identifier (CAM ID); and
  transmitting the encrypted LEK to the conditional access module for decryption and storage in the conditional access module.

10. The apparatus of claim 9, wherein the encrypted license encryption key (LEK) is transmitted to the conditional access module via a secure kernel, and wherein the secure kernel encrypts the encrypted LEK with a session key before forwarding the encrypted LEK to the conditional access module.

11. The apparatus of claim 9, wherein the conditional access module is disposed remote from the receiver.

12. The apparatus of claim 11, wherein the conditional access module is disposed at the headend.

13. The apparatus of claim 8, wherein the receiver station comprises a receiver and wherein:
  the instructions further comprise instructions for:
  authenticating the conditional access module;
  establishing a secure communication session between the conditional access module and the headend;
  storing at least one headend private key and a conditional access module public key;
  accepting the license request from the session management module;
  determining that a subscriber associated with the STB ID is authorized to view the media program;
  encrypting the content encryption key (CEK) with the receiver key to produce the encrypted content encryption key (ECEK);
  generating the license comprising the ECEK; and
  encrypting the license according to the license encryption key (LEK) to produce the encrypted license.

14. The apparatus of claim 8, wherein the instructions transmit the encrypted license to the receiver if the license is authenticated.

15. An apparatus for securely enabling the playing of a media program encrypted by a content encryption key (CEK), comprising:
  means for receiving a license request in a headend, the license request generated in response to a request for a license to view the media program and comprising a receiver identifier (STB ID);
  means for determining if the license request is authorized, for encrypting the CEK with a receiver key associated with the received STB ID to produce an encrypted content encryption key (ECEK), for generating a license comprising the encrypted content encryption key (ECEK), and for encrypting the license according to a license encryption key (LEK) to produce an encrypted license (ELF); and
  means for transmitting the encrypted license to a receiver station.

16. The apparatus of claim 15, wherein the receiver station comprises a receiver, and the STB ID is a globally unique receiver identifier and wherein:
  the license encryption key (LEK) is generated by the headend in response to a registration request from the receiver, the registration request comprising a globally unique receiver identifier (STB ID) wherein the license encryption key (LEK) is generated only if a conditional access module identified by a CAM ID is approved for use with the receiver identified by the STB ID;
  the generated LEK is encrypted according to a conditional access module key stored in the headend and associated with the conditional access module identifier (CAM ID);
  the encrypted LEK is transmitted to the conditional access module; and
  the encrypted LEK is decrypted by and stored in the conditional access module.

17. The apparatus of claim 16, wherein the encrypted license encryption key (LEK) is transmitted to the conditional access module via a secure kernel, and wherein the secure kernel encrypts the encrypted LEK with a session key before forwarding the encrypted LEK to the conditional access module.

18. The apparatus of claim 17, wherein the conditional access module is disposed remote from the receiver.

19. The apparatus of claim 18, wherein the conditional access module is disposed at the headend.

20. The apparatus of claim 15, wherein the receiver station comprises a receiver and the apparatus further comprises:
  means for receiving the encrypted license in the receiver;
  a conditional access module for decrypting the encrypted license using the license encryption key (LEK) stored in the conditional access module to produce the encrypted content encryption key (ECEK);
  means for decrypting the ECEK in the receiver using the receiver key to produce the content encryption key (CEK); and
  means for decrypting the media program using the CEK.

21. The apparatus of claim 15, wherein the means for determining if the license request is authorized further determines whether the license request is authenticated.

22. A method of securely enabling the playing of a media program encrypted by a content encryption key (CEK), comprising:
  transmitting a registration request from a receiver station to a headend, the registration request comprising a receiver identifier (STB ID);
  receiving a license encryption key (LEK) encrypted according to a conditional access module key stored in a conditional access module and in the headend, wherein the license encryption key (LEK) is received only if the conditional access module identified by a CAM ID is approved for use with the receiver identified by the STB ID;
  decrypting the encrypted LEK to recover the LEK;
  storing the LEK in a conditional access module at the receiver station;
  receiving a request to view the media program from a user;
  transmitting a license request from a receiver station to a headend, the license request comprising the STB ID and a media program identifier; and
  receiving a license encrypted by the license LEK, the license comprising the content encryption key (CEK) encrypted by a receiver key associated with the transmitted STB ID.

23. The method of claim 22, further comprising:
  decrypting the encrypted license to recover the encrypted content encryption key (CEK);
  decrypting the encrypted CEK according to the receiver key to produce the CEK; and
  decrypting the media program according to the CEK.

24. The method of claim 22, wherein the receiver station comprises a receiver and the conditional access module is disposed remote from the receiver.

25. The method of claim 24, wherein the receiver station comprises a receiver and the conditional access module is disposed at the headend.

26. The method of claim 22, wherein:
the conditional access module decrypts the encrypted license to recover the encrypted content encryption key (CEK); and
the receiver decrypts the encrypted CEK according to the receiver key to produce the CEK, and decrypts the media program according to the CEK.

27. The method of claim 22, wherein conditional access module is disposed remote from the receiver.

28. An apparatus for securely enabling the playing of a media program encrypted by a content encryption key (CEK), comprising:

a receiver for transmitting a registration request to a headend, the registration request comprising a receiver identifier (STB ID), for receiving a license encryption key (LEK) encrypted according to a conditional access module key, wherein the license encryption key (LEK) is received only if a conditional access module identified by a CAM ID is approved for use with the receiver identified by the STB ID the conditional access module for decrypting the encrypted LEK to recover the LEK and for storing the LEK;

wherein the receiver further receives a request for the media program from a user, transmits a license request from the receiver to a headend, the license request comprising the STB ID and a media program identifier; and receives a license encrypted by the license LEK, the license comprising the CEK encrypted by a receiver key associated with the transmitted STB ID.

\* \* \* \* \*